United States Patent [19]

Huntt

[11] Patent Number: 4,727,675

[45] Date of Patent: Mar. 1, 1988

[54] COLD WEATHER FISHING MITT

[76] Inventor: Robert L. Huntt, 10420 Watkins Rd., Germantown, Md. 20874

[21] Appl. No.: 55,525

[22] Filed: May 29, 1987

[51] Int. Cl.⁴ ............................................. A01K 97/00
[52] U.S. Cl. ........................................ 43/25; 2/161 A
[58] Field of Search ............... 43/25, 23, 26; 2/161 A, 2/158, 17

[56] References Cited

U.S. PATENT DOCUMENTS

| | | | |
|---|---|---|---|
| 295,586 | 3/1884 | Ross | 2/17 |
| 1,277,015 | 8/1918 | White | 2/158 |
| 2,650,361 | 9/1953 | Grothe | 2/17 |
| 2,869,277 | 1/1959 | Breithaupt | 43/26 |
| 2,997,042 | 8/1961 | Mitchell | 43/25 |
| 4,213,205 | 7/1980 | Smith | 2/161 A |
| 4,564,956 | 1/1986 | Dibuono | 2/161 A |
| 4,575,075 | 3/1986 | Tarbox | 2/161 A |

Primary Examiner—Gene P. Crosby
Attorney, Agent, or Firm—Murray and Whisenhunt

[57] ABSTRACT

A fishing mitt for covering a user's hand and a portion of the fishing rod mounted on the fishing rod is disclosed, wherein the fishing mitt fastens around the wrist or forearm of the user. The rod protrudes from the front of the mitt, and an aperture is provided through which line passes from the fishing reel to the rod guides. The aperture is maintained in relatively fixed positions with respect to the fishing rod, in order to minimize the frictional resistance imparted by the aperture to line passing therethrough during casting or line retrieval operations. The reel handles protrude through the side of the mitt, and can be operated by the hand of the user opposite from the hand inside of the mitt.

10 Claims, 8 Drawing Figures

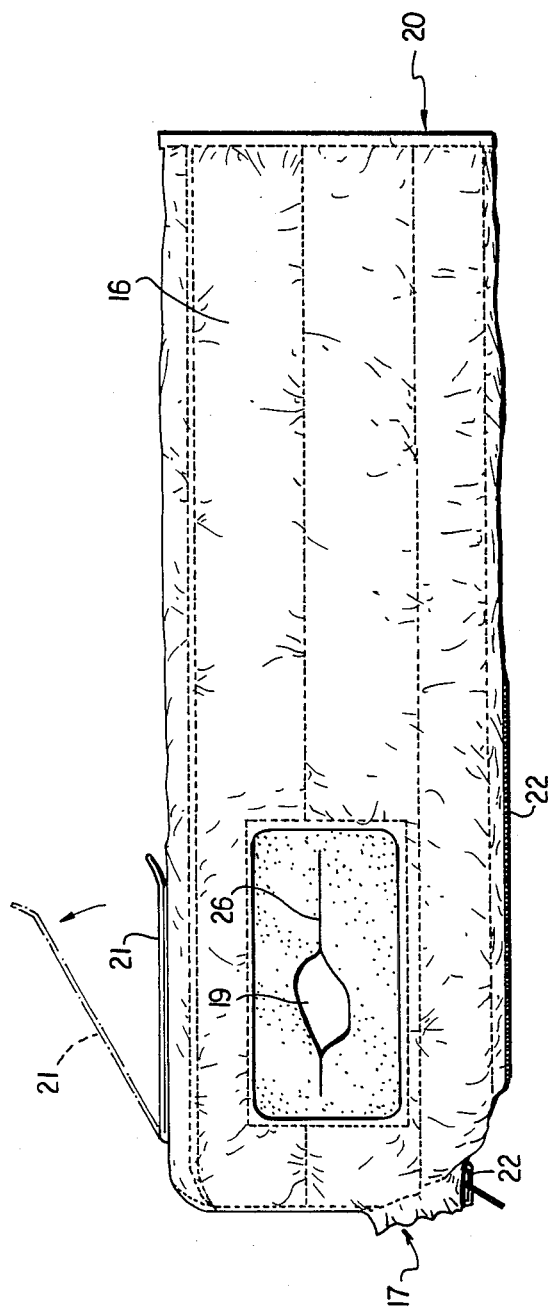
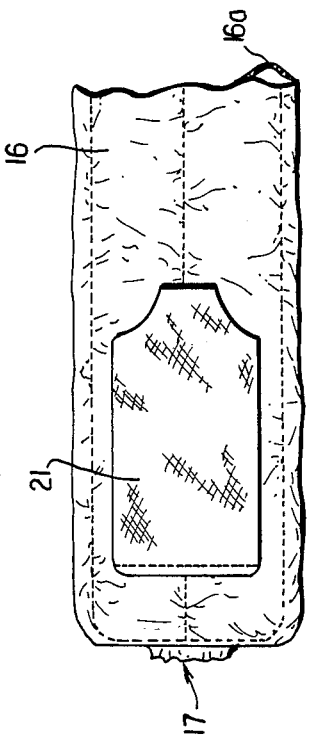
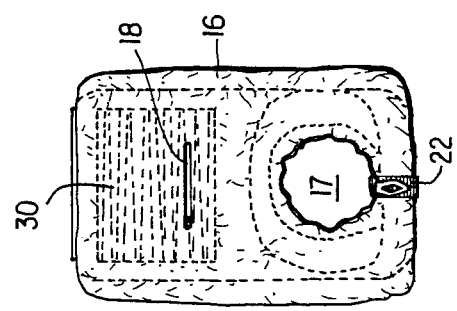
FIG. 4
FIG. 6
FIG. 5

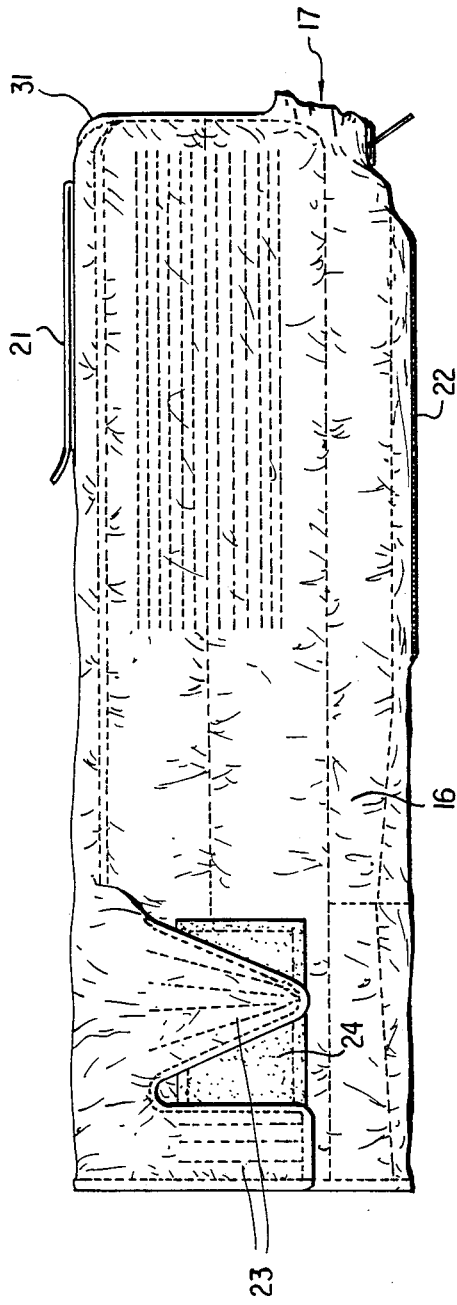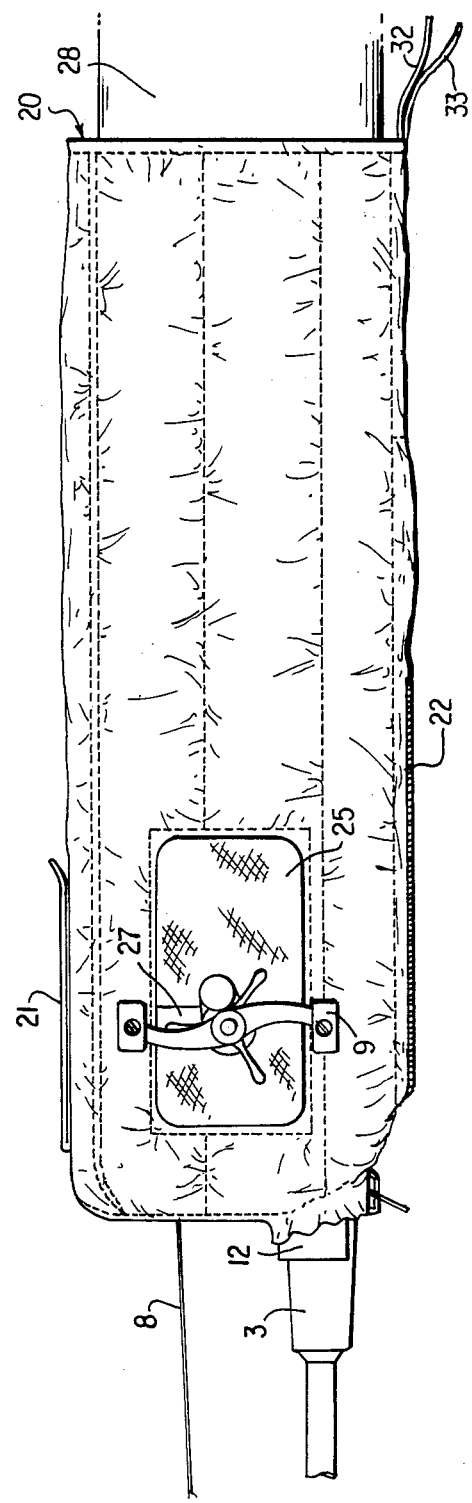

COLD WEATHER FISHING MITT

FIELD OF THE INVENTION

The present invention relate to fishing tackle, and specifically for a mitt for cold weather fishing using a rod and reel.

BACKGROUND OF THE INVENTION

Bait casting rod and reels have been in use for a number of decades, and are particularly used for fishing for largemouth and smallmouth bass. A freely revolving spool of line is mounted transversely to the axis of the rod on which the reel is mounted. During casting operation, the spool of line revolves, thereby releasing line from the reel. A user's thumb is utilized to apply pressure to the spool of line, to prevent line from being withdrawn until the proper moment during the casting operation. Upon release of the thumb pressure during the casting operation, the spool of line starts to revolve to release line therefrom. If the spool overruns the line being released, a backlash can result, to the detriment of perhaps considerable amount of fishing time. Therefore a user will generally lightly thumb the spool of line during the casting operation (together with pressure applied by various forms of mechanical and/or magnetic devices), to prevent any such overrun and resulting backlash.

This contact of the user's thumb with the spool of line wets the user's thumb, which can become most uncomfortable in cold weather. Because of the required sensitivity needed during the casting step, gloves on the hand which will thumb the reel are not considered practical. Furthermore, during the line retrieve with certain types of lures, such as, for instance, plastic worms, it is necessary to utilize a bare hand on the rod or even on the line being retrieved in order to detect soft strikes.

Some of the best fishing of the year in certain locations is during the months of January, February and March, during the period of time just prior to the bass spawning. At that time of year, even in warmer locales, such as certain of the southern states of the United States, a wet hand exposed to ambient conditions can be most uncomfortable, and in more northern locations the wet, exposed hand generally limits the amount continuous fishing time available to casters of artificial lures.

The Mitchell U.S. Pat. No. 2,997,042 discloses a handwarmer for fishing rods, wherein the handwarmer is built into the handle of the fishing rod or similar device, such as a ski pole. In order to improve the usefulness of the warmer, a fabric mitt is provided to snuggly embrace the handle, with the mitt being large enough to receive a hand through a hand opening (note column, lines 18–43 of Mitchell). As illustrated in FIGS. 2 and 6 of Mitchell, and as described at column 3, lines 60–68 of the patent, the mitt is applied to the handle, to snuggly embrace reel portion 82, prior to installing the reel or line winder. Thus, as illustrated in FIG. 6, the reel or line winder is mounted external to the fishing mitt of Mitchell, so that the Mitchell mitt would have no problem with frictional drag on line passing through the mitt itself from a fishing reel mounted inside of the fishing mitt.

SUMMARY OF THE INVENTION

The present invention is directed to a cold weather fishing mitt which permits essentially unimpeded casting and retrieving operation of a fishing reel, such as a bait-casting reel, while protecting the hand of the user which grips the fishing rod, and contacts the fishing line, from exposure to ambient conditions. The fishing mitt encompasses at least a portion of the fishing rod handle, a portion of a fishing reel mounted thereon and a user's hand gripping the handle. The fishing mitt device comprises a bag-shaped mitt and a guide therefore which mounts on the fishing rod in front of the reel and supports an aperture in the mitt through which line passes from the fishing reel to the rod line guides, with the arrangement causing minimal drag or frictional resistance on the line as it passes through the mitt line aperture. The operating handle of the fishing reel protrudes through the mitt, so that the reel handle can be operated by the user's hand which is opposite the hand gripping the rod and located inside of the fishing mitt.

The mitt has a front, a rear, a top, a bottom and sides, with the line aperture located at the front of the mitt. A rod aperture is also located at the front of the mitt, and provides an opening through which the rod can protrude. An aperture is located at the back of the mitt to provide an opening through which the user's hand can be inserted. The reel handles protrude through an aperture in the side of the mitt. It is also preferred to have an access opening in the mitt, and preferably in the top of the mitt, so that digital and visual access is provided to the line spool of the fishing reel, so that the user can reach any backlashes of line on the reel. The mitt is preferably made of at least water-resistant material, and preferably of water-repellent material, and it is also preferred that the mitt be insulated.

BRIEF DESCRIPTION OF THE DRAWINGS

The invention will be understood more readily with reference to the accompanying drawings, wherein

FIG. 4 is a left side view of the fishing mitt of the present invention;

FIG. 5 is a front end view of the fishing mitt of the present invention;

FIG. 6 is a partial top view of the fishing mitt of the present invention;

FIG. 7 is a right side view of the fishing mitt of the present invention, taken from the opposite side as compared to FIG. 4; and FIG. 8 is a left side view of the fishing mitt of the present invention, mounted in combination with the guide of FIG. 1 on a fishing rod and reel combination.

DETAILED DESCRIPTION OF THE INVENTION

Figure 1:
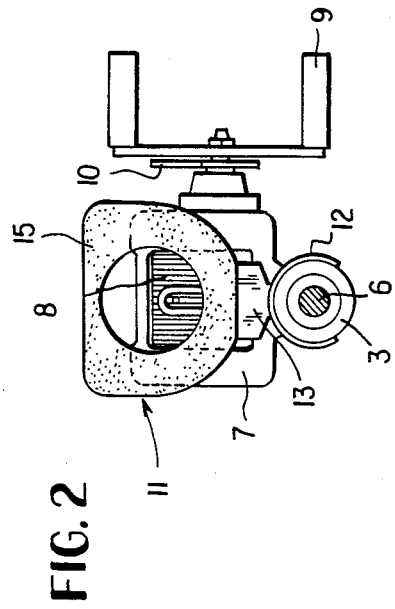
FIG. 1 is a schematic view of the guide of the present invention which maintains a line aperture of the fishing mitt of the present invention in predetermined relationship to the fishing reel/fishing rod combination.
Figure 2:
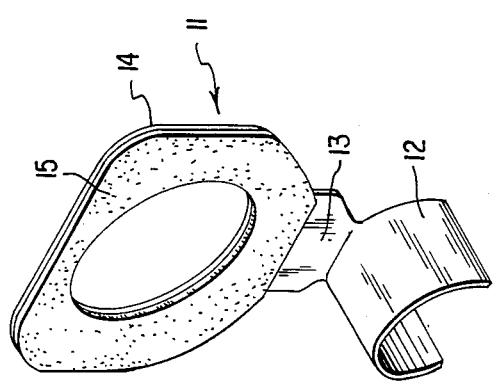
FIG. 2 is a front view of the guide of FIG. 1, shown mounted on a rod and reel combination partially depicted in cross-section.
Figure 3:
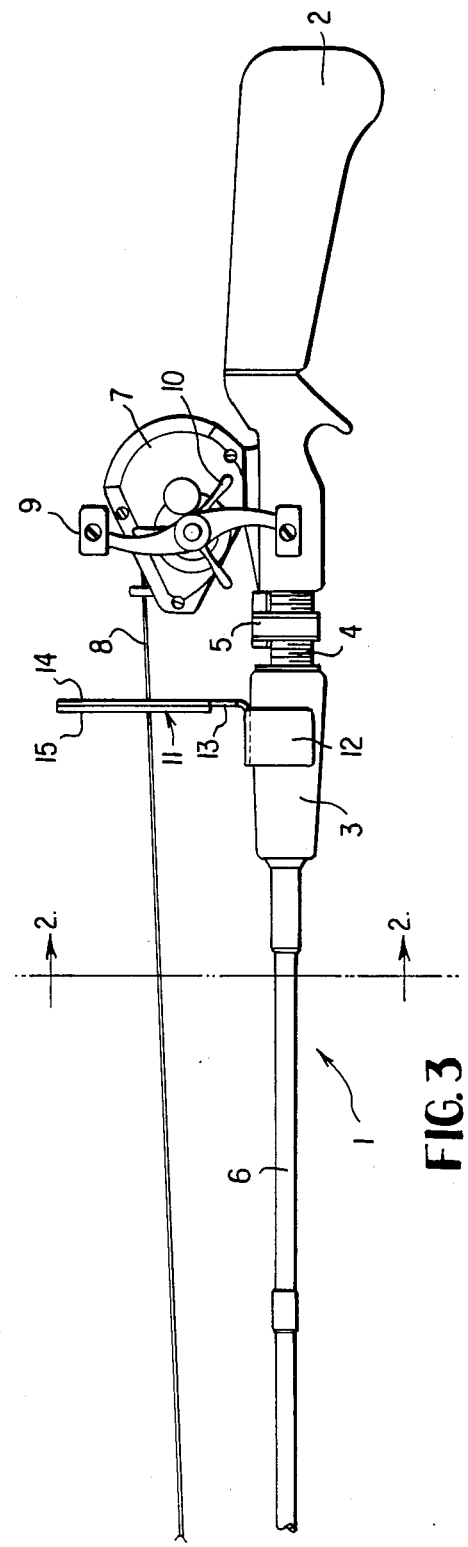
FIG. 3 is a left side view of the lower or butt portion of a fishing rod, having a bait-casting reel mounted thereon, and having the guide of FIG. 1 mounted thereon.

Referring to FIGS. 1, 2 and 3, a conventional bait-casting rod 1 includes rear handle 2, front handle portion 3, reel seat 4, reel retaining ring 5, and shaft 6 to which are mounted line guides (not shown). Bait-casting reel 7, of conventional design, is mounted on reel seat 4, and retained by ring 5. Reel 7 carries line 8 therein, and is operated by handles 9. The reel drag is adjusted by drag control 10.

Guide 11 is mounted on front handle portion 3, in frictional engagement therewith, and is made of relatively rigid material. Guide 11 includes a mounting portion 12, shaped to fit tightly over a portion of tapered front handle portion 3, and is connected by connector piece 13 to an upper, aperture surround portion 14, which in use surrounds the aperture in the fishing mitt through which line 8 passes. The front face of aperture surround 14 is covered with Velcro 15, to facilitate attachment to the mitt, as described hereinbelow.

Referring to FIGS. 4–7, the mitt 16 is preferably made of material which is at least relatively water-resistant, and more preferably is of waterproof material. Preferably mitt 16 has a lining of insulation 16a, such as of "Thinsulate," on the inner surfaces thereof. Rod aperture 17 is at the front of mitt 16, and line aperture 18 is located at the front of mitt 16 above rod aperture 17. Reel handle aperture 19 is mounted on the left hand side of mitt 16, and provides a space through which the handles 9 of the fishing reel 7 can protrude. Aperture 20, located at the rear of mitt 16, permits a user's hand and wrist, and optionally the front portion of the user's forearm, to be inserted into the mitt 16. Aperture cover 21 covers an aperture slightly smaller than cover 21, which permits access to the line on the reel, to facilitate threading the line through aperture 18, and to provide access to possible backlashes on the reel.

Zipper 22 is mounted on the front portion of the bottom of mitt 16, and serves to open up the mitt in the area of rod aperture 17 to facilitate the placement of mitt 16 over the rod handle and reel mounted thereon.

Wrist adjustment tabs 23 are located on the right side of the mitt 16, and contain Velcro (not shown) on the inner side thereof, cooperating with Velcro 24 mounted on the right side of mitt 16, so as to permit adjustment of fishing mitt 16 around the user's arm or wrist, to preclude or minimize heat loss from the rear of fishing mitt 16.

The reel handle aperture 19 could permit heat loss from the interior of mitt 16, and is preferably covered by reel handle aperture cover 25, which serves to reduce the size of any openings in reel handle aperture 19 through which air can enter or leave the interior of mitt 16. Reel handle aperture 19 includes slits 26 associated therewith, to facilitate passage of the reel handles through the aperture, and without the use of reel handle aperture cover 25 a substantial gap, exposing the user's hand to frigid air, can exist. The cover 25 has Velcro (not shown) mounted on one side thereof, cooperating with Velcro 27 mounted around reel handle aperture 19 and associated slit 26. Reel handle aperture cover 25 has a slit or gap 28 therein, to facilitate mounting cover 25 around handle 9.

FIG. 8 illustrates the mitt in position on a fishing rod and reel, with line threaded through the aperture 18 and through the rod guides (not shown). A user's arm 29 protrudes from the rear of fishing mitt 16. Stitching 30, 31 may be used to reinforce/stiffen the fishing mitt.

In operation, after the reel 7 is firmly mounted on rod 1, guide 11 is mounted on front handle portion 3. Zipper 22 is zipped open as far as possible, and reel handle aperture cover 25 is removed from mitt 16. The rear of rod 1 can be inserted through rod aperture 17 and the opening formed by unzipping zipper 22. Alternatively, and less preferably, the front or shaft end of rod 1 can be inserted through aperture 20. During the mounting of mitt 16 on the rod and reel, the reel handles 9 are passed out of reel handle aperture 19, and Velcro (not shown) mounted on the front interior surface of mitt 16, and surrounding aperture 8, is guided into proper contact with the Velcro 15 on guide 11, so as to properly orient line aperture 18 with the fishing reel, and to hold that orientation, thereby minimizing frictional drag on the line as the line passes out of mitt 16.

Reel handle aperture cover 25 can be fitted underneath reel handle 9 and drag control 10, so that the Velcro on the inner side of cover 25 and the outer side of mitt 16, surrounding reel handle aperture 19, serve to hold cover 25 firmly in place. Zipper 22 can then be closed, and access aperture cover 21 opened to provide visual and digital access to the line on reel 7. In some instances, it may be convenient to insert a hand through aperture 20 for digital access to the line. In any event, the line is passed through any level winding device on reel 7, and then is passed through aperture 18, through the guides (not shown) on rod 1 and attached to a lure, hook, or the like. Access aperture cover 21 is then closed. The fishing mitt is mounted on the rod and reel combination and ready for action. The user's hand is inserted through aperture 20, and wrist adjustment tabs are utilized to reduce the size of aperture 20, to prevent substantial amounts of air ingress or egress, or other forms of heat loss, from the interior of mitt 16. The user's hand will be in a position to exert some pressure on the line spooled on the reel, or to operate a thumb bar or the like, depending upon the design of the particular fishing reel utilized, and the line being spooled on the reel during the retrieve can be contacted by a digit to aid in detecting soft strikes. The thumbing of the line, or other contact with the line, which normally causes the user's hand to become wet, can be done comfortably in cold weather, since the hand is not exposed to the ambient temperature or to the chilling affects of wind, and thus can remain relatively comfortable. At the same time, the opposite hand of the user can operate reel handles 9, and with reasonable care that hand should not become wet. Since sensitivity is not required to operate reel handle 9, the hand of the user operating the handle can even be covered with a conventional glove.

While the above description has been with reference to a bait-casting rod and reel, it will be readily observed by those in the art that the fishing mitt of the present invention is likewise applicable to spincasting rods and reels, to spinning rods and reels, to side casting rods and reels, and the like. For changes in the reel type, it may be necessary to make corresponding changes in the general configuration of the fishing mitt. In addition, an opening (not shown) may be provided in the bottom rear portion of the fishing mitt to permit a portion of the handle of a long-handled fishing rod to protrude. Furthermore, the reel handles may be on either side of the reel, with reel handle aperture 19 located accordingly.

Guide 11 is preferably made of metal. However, it will be clear to those in the art that any relatively rigid guide can function in combination with or as part of the fishing mitt of the present invention, so long as the line aperture is maintained in a relatively fixed position, with respect to the reel and line, during fishing operations, so as to minimize frictional drag on the line during casting operations and during reeling operations. It is even possible to stiffen the front of fishing mitt 16 to a sufficient degree, and to have the fishing mitt attached to a device such as mount 12 for firmly affixing the front of mitt 16 to rod 1, or the stiffened fishing mitt can be otherwise attached to the rod, so long as the desired criteria of eliminating or minimizing frictional drag on the line, by maintaining aperture 18 in relatively fixed position with respect to line 8, is achieved.

In an optional embodiment illustrated in FIG. 8, a pair of electrical heating wires 32, 33 can extend from a battery (not shown) to mitt 16. Wires 32, 33 are arranged in a pattern of heating wires inside of mitt 16, and are ultimately joined to each other to provide a complete electrical circuit. With the heat provided by the use of the electrical resistance wires in combination with a suitable source of electrical power (e.g., a 12 volt wet cell battery located in a boat could be used, or a dry cell battery, such as a 9 volt lantern battery could also be utilized), the user's hand can stay warm and comfortable even under extremely cold conditions.

I claim:

1. A fishing mitt for encompassing
   (a) at least a portion of a handle of a fishing rod,
   (b) a portion of a fishing reel mounted on said rod, and
   (c) said fishing mitt protecting the user's hand from the elements while gripping said handle to permit the fishing reel to be operated,
   said mitt comprising relative rigid guide means mounted on the fishing rod in front of the reel mounted thereon for providing support for an aperture in said mitt through which line passes from the fishing reel to line guides on the rod, and
   mitt means having a front, a rear, a top, a bottom and sides for covering the user's hand, a portion of the reel, and at least a portion of the fishing rod handle, said mitt means including:
   first aperture means located at the front of the mitt means for providing an opening through which the rod can protrude,
   second aperture means located at the front of the mitt means for providing an opening through which the line can pass, said second aperture means being held in relatively fixed position relative to the rod and the reel by said guide means to minimize or reduce frictional forces on the line passing therethrough,
   third aperture means located on a side of the mitt means for providing an opening through which an operating handle of the fishing reel can operatively protrude, and
   fourth aperture means located proximate the back of the mitt means for providing an opening through which a user's hand can be inserted to grip the rod handle and to contact the fishing reel.

2. Mitt of claim 1, wherein the outer surface of said mitt is of material which is at least water resistant, and said mitt is insulated.

3. Mitt of claim 2, wherein said guide means includes a mounting means for fitting on a front portion of the rod handle forward of the reel, and aperture surround means fixedly connected to said mounting means and in use surrounding the said second aperture means for maintaining said second aperture means in relatively fixed position with respect to line coming off of the reel.

4. Mitt of claim 2, wherein a zipper is located on the bottom of the mitt and extends rearward from the first aperture means.

5. Mitt of claim 2, wherein said second aperture means is a generally horizontal slit.

6. Mitt of claim 2, wherein said mitt additionally includes cover means for at least party closing the third aperture means after a reel handle has been passed therethrough.

7. Mitt of claim 2, wherein the aperture size of said fourth aperture means is adjustable to prevent substantial heat loss therethrough when in use.

8. Mitt of claim 2, further including fifth aperture means located on the top of the mitt and generally above the fishing reel for permitting access to the reel and line thereon for initial set-up and/or for undoing backlashes on the reel.

9. A fishing mitt for covering a user's hand and a portion of a fishing reel mounted on a fishing rod to permit fishing during cold weather, said mitt of generally bag-like configuration and having a front, sides, a top and a bottom, with the back of the mitt generally open to receive the user's hand, the front of the mitt having an upper line aperture and a lower rod aperture, at least one side of the mitt having a reel handle aperture, and the top of the mitt having a reel access aperture, and guide means for maintaining said line aperture in relatively fixed position relative to the rod and to line coming off the reel.

10. Mitt of claim 9, wherein the mitt includes electrical wire means embedded in the mitt for heating the hand of a user inserted in the mitt when the wires are connected to a suitable source of electricity.

* * * * *